United States Patent
Kishore et al.

(10) Patent No.: US 8,539,592 B2
(45) Date of Patent: Sep. 17, 2013

(54) METHOD AND APPARATUS OF ENCRYPTING CONTENT DELIVERY

(75) Inventors: Kelly Y. Kishore, San Jose, CA (US);
Gerard M. Fernando, Mountain View, CA (US); Pragyan Debadarshini, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 841 days.

(21) Appl. No.: 12/164,632

(22) Filed: Jun. 30, 2008

(65) Prior Publication Data

US 2009/0327691 A1    Dec. 31, 2009

(51) Int. Cl.
*H04L 29/06* (2006.01)
(52) U.S. Cl.
USPC .............................. 726/26; 705/51
(58) Field of Classification Search
None
See application file for complete search history.

(56) References Cited

U.S. PATENT DOCUMENTS

| | | | |
|---|---|---|---|
| 6,105,134 A * | 8/2000 | Pinder et al. | 713/170 |
| 7,403,618 B2 * | 7/2008 | Van Rijnsoever et al. | 380/239 |
| 2002/0083002 A1 * | 6/2002 | Menez et al. | 705/52 |
| 2003/0227373 A1 * | 12/2003 | Lou et al. | 340/310.01 |
| 2005/0192904 A1 * | 9/2005 | Candelore | 705/51 |
| 2009/0024846 A1 * | 1/2009 | Ganesan et al. | 713/162 |

* cited by examiner

*Primary Examiner* — Gilberto Barron, Jr.
*Assistant Examiner* — Malcolm Cribbs
(74) *Attorney, Agent, or Firm* — Osha Liang LLP

(57) ABSTRACT

A method for delivering a data stream to a plurality of clients in a network. The method involves receiving the data stream from a media server, where the data stream includes a plurality of data packets and a data stream identifier associated with at least one of the plurality of data packets, securing the data stream received from the media server by applying a filter to the data stream to obtain a filtered data packet from the plurality of data packets based on the data stream identifier, encrypting the filtered data packet using an encryption scheme to obtain a encrypted media content, and distributing the encrypted media content to at least one of the plurality of clients in the network.

7 Claims, 5 Drawing Sheets

METHOD AND APPARATUS OF ENCRYPTING CONTENT DELIVERY

BACKGROUND

Media content, such as audio and/or video information, medical or educational documentation, applications, or other types of electronic information, is often delivered to consumers in a protected format. For example, data may be transmitted as a data stream by a transmission system, which includes a transmitter, a transmission medium, and a receiver. The transmitter converts information into a signal carried by a transmission medium. A receiver receives the signal and converts it back into usable information. The transmission system may include other elements, such as routers to route the information during transmission or amplifiers to increase the strength of the transmission signal. Data may be transmitted in the form of a data stream using terrestrial (over-the air) signals or via cable (fiber optic, etc.) and may conform to a transport standard and format, such as MPEG-2 (applicable to video data and associated audio information).

The data being transmitted may require encryption to prevent unauthorized access during transmission. All or part of the data may be protected using encryption algorithms within an encryption scheme. The encryption scheme may involve an algorithm (along with other data) to transform data to a protected state. When the data is protected, others may not decrypt it without knowing specific data, such as certain private or public keys. When transmitting data, the data is protected (encrypted) prior to transmission to a client and is decrypted upon receipt by the client. Once the data has been decrypted, the client can display and use the information contained in the data. Other data used to perform the encryption, such as public keys, stream keys, access keys, and algorithms, may be stored in an accessible database but is often separate from the data being transmitted. Upon receipt of the protected data by the client, a secondary system may access the client's private keys to decrypt the data. After decryption, the client may display and use the data.

SUMMARY

In general, in one aspect, the invention relates to a method for delivering a data stream to a plurality of clients in a network. The method comprises receiving the data stream from a media server, wherein the data stream comprises a plurality of data packets, and a data stream identifier associated with at least one of the plurality of data packets, securing the data stream received from the media server by applying a filter to the data stream to obtain a filtered data packet from the plurality of data packets based on the data stream identifier, encrypting the filtered data packet using an encryption scheme to obtain a encrypted media content, and distributing the encrypted media content to at least one of the plurality of clients in the network.

In general, in one aspect, the invention relates to a system for encrypting a data stream. The system comprises a media server, an encryption engine, and a plurality of clients. The media server is configured to receive a data stream and comprising functionality for transmitting the data stream to an encryption engine, wherein the data stream comprises a plurality of data packets, and a data stream identifier, wherein the data stream identifier is associated with at least one of the plurality of data packets. The encryption engine is configured to receive the data stream from the media server and comprising functionality to apply a filter to the data stream to obtain a filtered data packet from the plurality of data packets based on the data stream identifier, apply a set of encryption schemes to the filtered data packet to obtain a encrypted media content, and distribute the encrypted media content to at least one of a plurality of clients. The plurality of clients comprise functionality to receive the encrypted media content from the encryption engine, decrypt the encrypted media content to obtain the data packet, and display the data packet.

Other aspects and advantages of the invention will be apparent from the following description and the appended claims.

DETAILED DESCRIPTION

Figure 1:
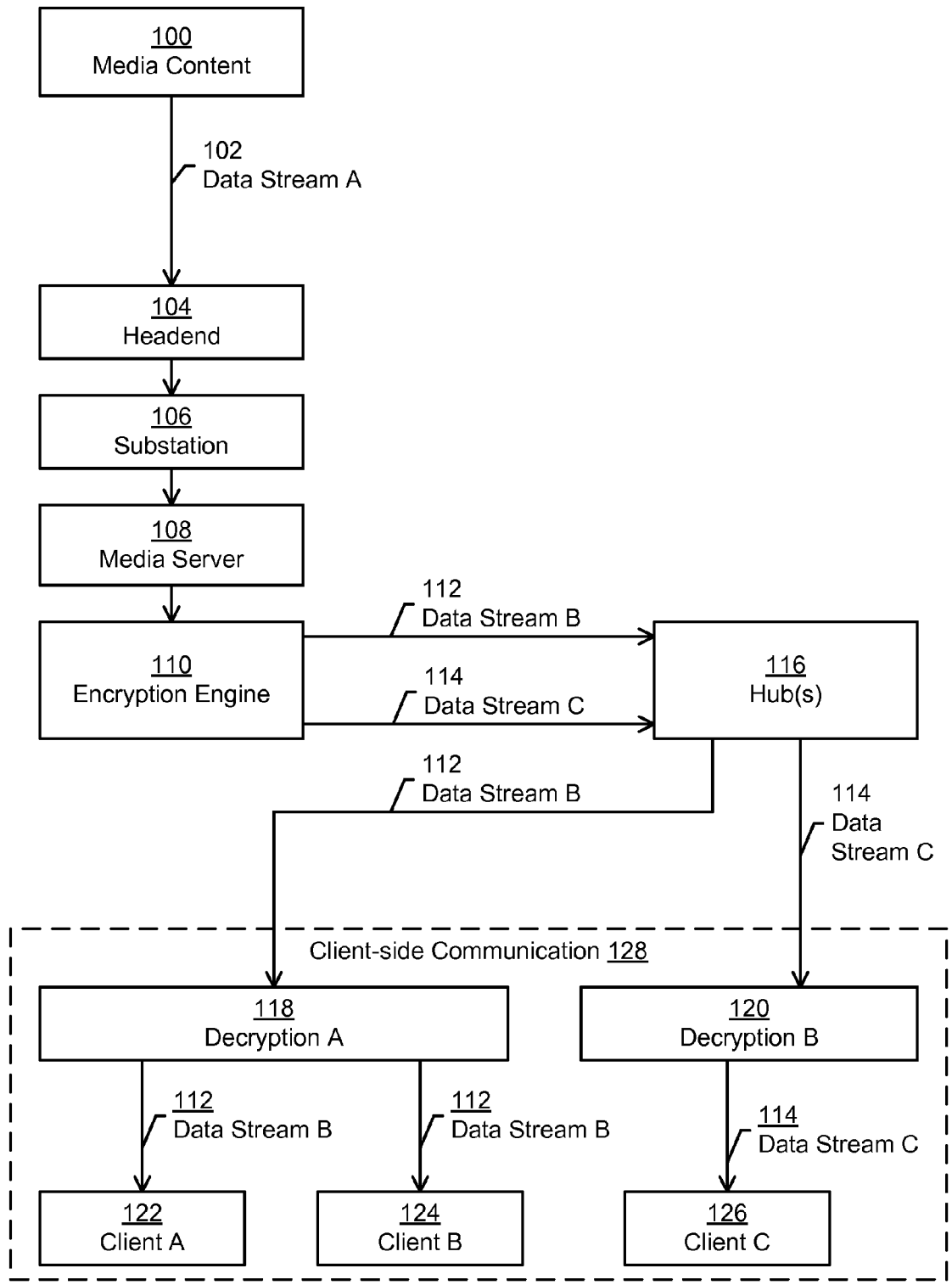
FIG. 1 shows a transmission system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for delivering a protected data stream to clients. More specifically, embodiments of the invention relate to a method and system for receiving the data stream from a media server, securing the data stream received from the media server by applying a filter to the data stream to obtain a filtered data packet from the plurality of data packets based on the data stream identifier, encrypting the data packet using an encryption scheme to obtain a encrypted media content, and distributing the encrypted media content to at least one of the plurality of clients in the network.

FIG. 1 shows a transmission system in accordance with one or more embodiments of the invention. The transmission system delivers (e.g. through distribution) media content (100). In one or more embodiments of the invention, the media content (100) may include audio and video information, electronic documentation, and/or application content.

In one or more embodiments of the invention, the media content (100) is sent in data stream A (102). A data stream (such as data stream A (102)) generally transmits electronic information using a sequence of digitally encoded coherent signals, as explained below. The data stream may include data packets (e.g. formatted blocks of data) or a series of characters or bits (e.g. a string, a byte, etc.). In one or more embodiments of the invention, a data packet is often referred to as a payload, a media content identifier, etc. The data stream may conform to a standardized format (e.g. MPEG-2 for audio and video information, explained below in relation to FIG. 4) that allows for storage and transmission of media content (100)

through telephone lines, broadcast satellite, the Internet, and/or over coaxial or fiber-optic cable lines.

Continuing with FIG. 1, the data stream A (102) may be used to transmit digital cable television signals, such as those used for video on demand or pay per view. In one or more embodiments of the invention, where the data stream A (102) is a cable television signal, the signal may be sent through several intermediate locations before reaching the customer. For example, the data stream A (102) may be sent via a broadcast satellite and received by a headend (104). The headend (104) generally includes functionality to receive data streams (e.g. data stream A (102)) and then process and distribute the data streams appropriately. Data stream A (102) is then forwarded from the headend (104) to a substation (106). The substation (106) receives the signal, strengthens it through amplification (if necessary), and then send the signal (data stream A (102)) to a media server (108). In one or more embodiments of the invention, the media server (108) stores the information transmitted in data stream A (102) in preparation of processing the signal. In one or more embodiments of the invention, the signal processing includes filtering and encrypting the signal and obtaining one or more data streams. If data stream A (102) is a digital television signal, then the data stream is typically encrypted to protect the signal from unauthorized distribution, display, and/or use. In one or more embodiments of the invention, the encryption is performed by an encryption engine (110).

As shown in FIG. 1, the media server (108) receives data stream A (102), which is processed by the encryption engine (110) in accordance with one or more embodiments of the invention. Data stream A (102) may then be filtered by the encryption engine (110) using information contained within the data stream. The filtering process may determine the destination(s) to which specific data packets (within data stream A (102)) are to be sent. The filtering process also may determine which data packets are to be encrypted and which encryption scheme(s) to use.

Continuing with FIG. 1, the encryption engine (110) filters data stream A (102) into two separate data streams, encrypts each separate data stream, and sends the reconfigured and encrypted data out in two streams (data stream B (112) and data stream C (114)) in accordance with one or more embodiments of the invention. in one or more embodiments of the invention, the encryption engine encrypts data stream B (112) and data stream C (114) with different encryption schemes for each stream (e.g. an asymmetric encryption scheme for data stream B (112) and a symmetric encryption scheme for data stream C (114)), or the same encryption scheme but use different encryption data (i.e. public and private keys), depending on the information contained within the data stream.

Next, data stream B (112) and data stream C (114)) are sent to hub(s) (116) in accordance with one or more embodiments of the invention. The hub(s) (116) generally include one or more hubs, and each hub may be configured to receive data stream(s) from the encryption engine (110) and forward each data stream to the destination (i.e. client or clients specified within the data stream). A hub typically serves one set of clients located within a limited geographic area (i.e. a subdivision or neighborhood).

Finally, the hub(s) (116) forward each data stream to its intended destination, where the data stream is decrypted and can be displayed by the client(s). Specifically, FIG. 1 shows that data stream B (112) is sent to decryption A (118), where the data stream is decrypted. Decryption is generally performed at the client by way of a software application running on a memory card. For example, decryption may be performed using a smart card including, but not limited to, a Java™ card. Data stream B (112) is sent from decryption A (118) to two different clients (e.g. client A (122) and client B (124)). The two different clients (e.g. client A (122) and client B (124)) both receive the decrypted data stream and are now capable of displaying and/or using decrypted data stream B (112). In one or more embodiments of the invention, decryption A (118), decryption B (120), client A (122), client B (124), and client C (126) are all located on the client side of a client-server topology and involved in client-side communication (128). Accordingly, decryption A (118) is performed at client A (122) and at client B (124), while decryption B (120) is performed at client C (126).

Continuing with FIG. 1, the hub(s) (116) also send data stream C (114) to decryption B (120) in accordance with one or more embodiments of the invention. Next, decryption B (120) decrypts data stream C (114). In one or more embodiments of the invention, encryption B (120) is performed at client C (126) and may use a software application running on a memory card. After data stream C (114) is decrypted, client C (126) can display and/or use data stream C (114) in any manner know to those skilled in the art. Further, data stream C (114) may be sent directly from the hub(s) (116) to decryption B (120), located at client C (126) (but not to any other client). Said another way, data stream C (114) is encrypted only for client C (126). In one or more embodiments of the invention, clients A (122), B (124), and C (126) may use a variety of devices to receive, display, or use data stream C (114), including but not limited to, a television, a computer, or a hand-held device.

Figure 2:
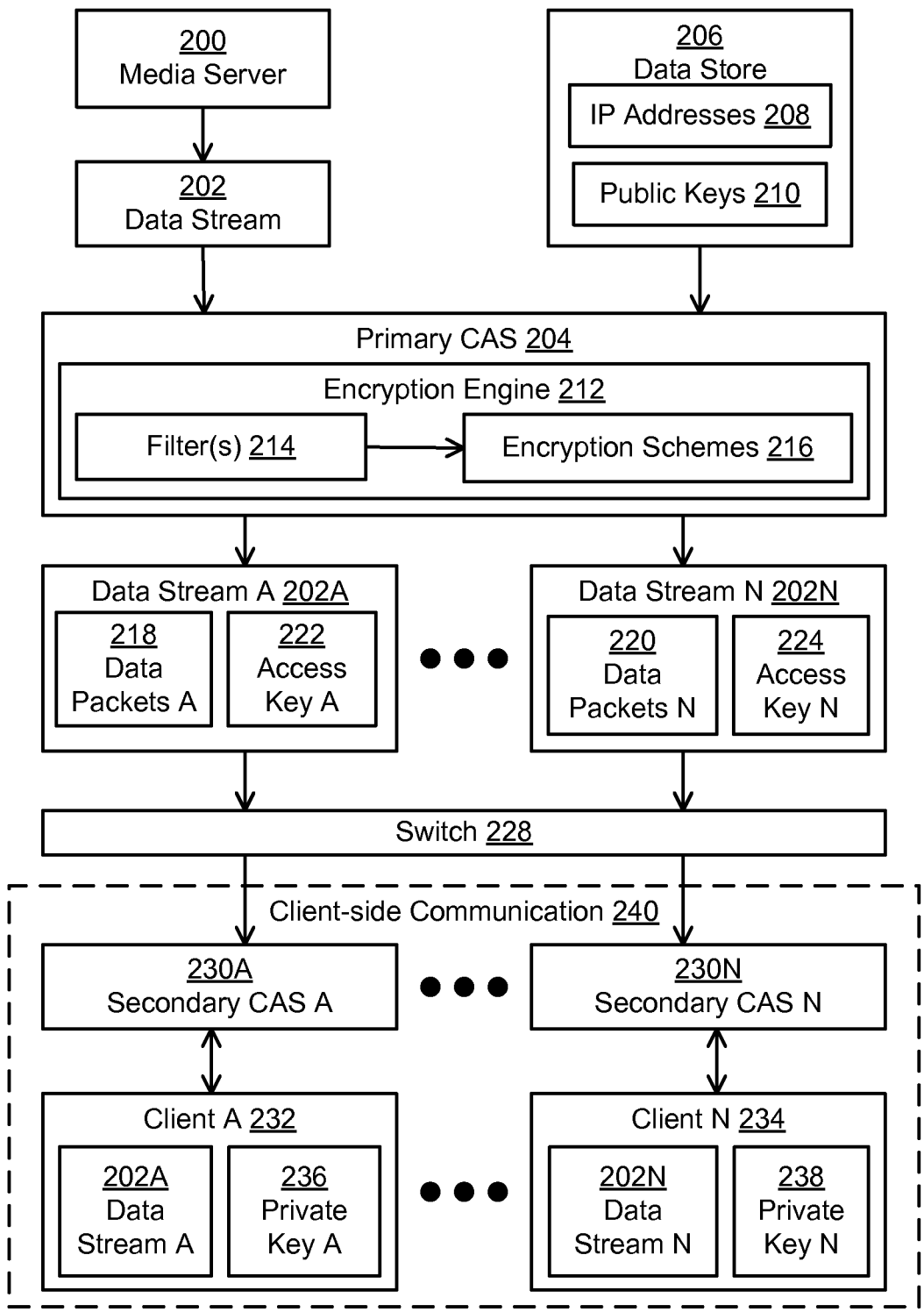
FIG. 2 shows data flow of a transmission system in accordance with one or more embodiments of the invention.

FIG. 2 shows a transmission system in accordance with one or more embodiments of the invention. In one or more embodiments of the invention, the data stream (202) in the transmission scheme shown in FIG. 2 (and described below) may be digital television signals, such as video and audio media content. However, while the description refers to digital signal transmission, this invention should not be limited to simply the transmission of digital televisions signals.

The data stream (202) may be broadcast by terrestrial, cable, and satellite systems. The data stream (202) is essentially the same as the one described in relation to FIG. 1. The data stream (202), or data packets within the data stream (202), may be encrypted after transmission by the media server (200) and prior to transmission to the switch (228). In the case where the data stream (202) includes digital signals, the data stream (202) may be sent using internet protocol to transmit the data in a packet-switched internetwork (i.e. the data packets are routed between points in a network along with other data packets or network traffic).

Continuing with FIG. 2, where the data stream (202) is a digital television signal, the source of the data within the data stream (202) may be a media server (200). The media server (200) processes digital television signals to create data streams, which the media server (200) then transmits. From the media server (200), the data stream (202) is sent to a primary conditional access system (CAS) (204). In one or more embodiments of the invention, the primary CAS (204) is a part of a system used to limit access to specific data streams to specific clients by means of encryption. The primary CAS (204) may also provide key management and encryption of the data stream (202) in conjunction with the encryption engine (212) and data store (206).

The encryption engine (212) includes functionality to filter the data stream (202) with filter(s) (214) to determine which sets of data packets to group and encrypt. The data packets may be filtered based upon unique identifying information and reconfigured into other data streams, and encryption schemes (216) may then be applied to the data streams or data packets. The encryption schemes may use asymmetric or symmetric encryption methods, such as AES (Advanced Encryption Standard) or RSA encryption, as well as varying key lengths. The data stream (202) may also contain destination information for its data packets (or for the entire stream). Further, the primary CAS (204) may obtain client IP addresses (208) and a client's public keys (210) from an external data store (206), using the destination information.

In one or more embodiments of the invention, the data store (206) typically contains IP addresses (208) and public keys (210) with information regarding association to various clients, identified as destinations. When the primary CAS (204) obtains destination information from a particular data stream, the destination information may be used to obtain the associated IP addresses (208) and public keys (210) by accessing the data store (206). The client's public keys (210) are used by the primary CAS (204) to encrypt the data. The encryption engine (212) encrypts the data using public keys (210) specific to each client or set of clients, based on the destination information within the data stream (202).

Continuing with FIG. 2, in one or more embodiments of the invention, the encryption engine (212) filters the data stream (202) into other data streams (e.g. data stream A (202A) through data stream N (202N)). These data streams contain data packets (e.g. data packets A (218) and data packets N (220)) and may also contain access keys (e.g. access key A (222) and access key N (224)). In one embodiment, the access keys (e.g. access key A (222) and access key N (224)) may be sent separately to the client (e.g. client A (232) and client N (234)) (i.e. not multiplexed into a data stream). The access keys (e.g. access key A (222) and access key N (224)) are necessary for the clients to decrypt the content.

Next, the data streams (data stream A (202A) through data stream N (202N)) pass through a switch (228), which reads the destination information within the data stream and then directs each stream to its respective destinations in accordance with one or more embodiments of the invention. Each data stream may be directed to an individual client or set of clients, and each data stream contains data packets encrypted using key information specific to the client(s).

Continuing with FIG. 2, in one or more embodiments of the invention, secondary CAS A (230A), secondary CAS N (230N), client A (232), and client N (234) are involved in client-side communication (240) and located on the client-side of a client-server topology. Accordingly decryption is performed at client A (232) and at client B (234). For example, as shown in FIG. 2, data stream A (202A) is sent to client A (232) using secondary CAS A (230A), located at the client. In one or more embodiments of the invention, secondary CAS A (230A) is designated for client A (232) to decrypt the content sent in data stream A (202A). In one or more embodiments of the invention, in the case where the data stream is a digital cable television signal, a secondary CAS may be an electronic device contained within the client's cable box. For example, a secondary CAS may be in the form of a smart card.

Continuing with FIG. 2, the secondary CAS A (230A) uses the private key A (236) of client A (232) in combination with the access key A (222) to decrypt the content in data stream A (202A). After the data stream A (202A) is decrypted, client A (232) can access and display and/or use the content. Similarly, for client N (234), the switch (228) directs data stream N (202N) to secondary CAS N (230N) and client N (234). The secondary CAS N uses the private key N (238) of client N (234) along with the access key N (224) to decrypt data stream N (202N). Client N (234) may then access and display and/or use the content.

Those skilled in the art will appreciate that the aforementioned discussion may be applied using any type of data or transmission, provided that the data is encrypted subsequent to the media server and prior to receipt by the client.

Figure 3:
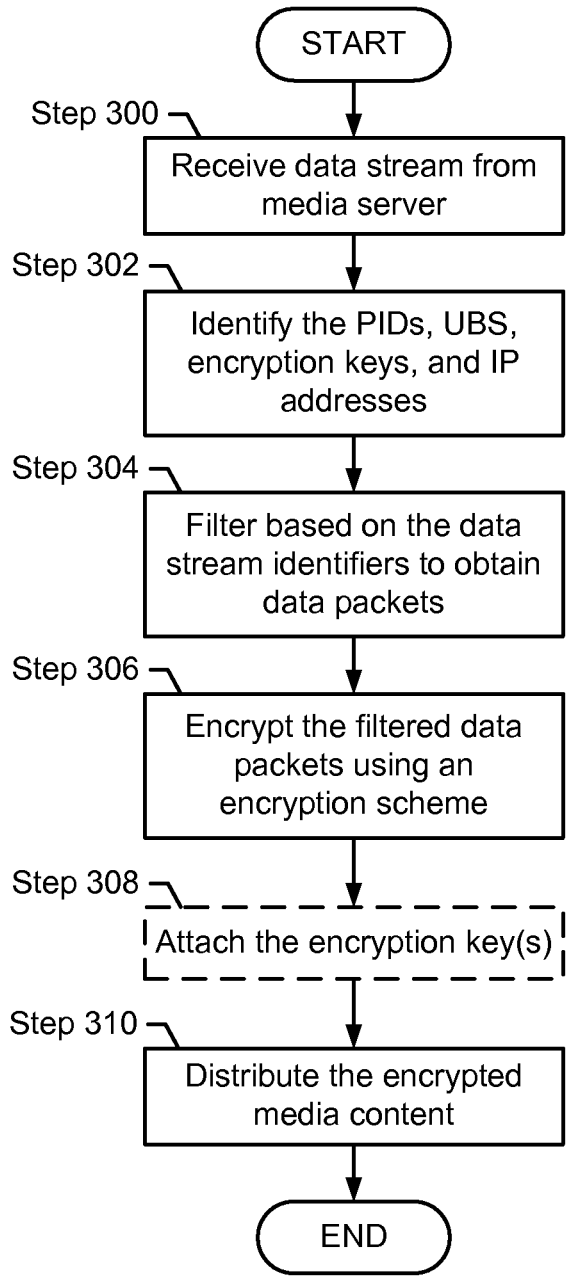
FIG. 3 shows a flowchart in accordance with one or more embodiments of the invention.

FIG. 3 shows a flowchart in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangement of steps shown in FIG. 3.

Initially, the data stream is received by the encryption engine from the media server (Step 300) in accordance with one or more of the embodiments of the invention. As described above, the data stream may be transmitted as a signal using frequencies corresponding to terrestrial channels, as in the case of television stations. Data streams sent as signals and transmitted over the air use networks of satellites, antennas, microwave towers, and amplifiers to transmit the data. A data stream may also be delivered using telephone lines, the Internet, and/or over coaxial or fiber-optic cable lines.

In Step 302, the encryption engine identifies the program identifications (PIDs), unique bit sequences (UBSs), encryption keys and IP addresses for the data packets in accordance with one or more of the embodiments of the invention. In one or more embodiments of the invention, the PIDs, UBSs and IP addresses are data stream identifiers. The PIDs and UBSs are contained within the data packets and the encryption engine may identify these by analyzing the bits contained in each data packet (e.g. the PID and UBS). The encryption keys and IP addresses may be obtained from a separate database. These are identified through association with the destination of the data packets, specified within the data packets when the data stream is sent. Identifying information, such as that listed above, allows the encryption engine to identify the data packets. In one embodiment of the invention, the encryption engine may create new PIDs for a data packet. The encryption engine may attach the new PIDs within the data packet or to the data stream, or use the new PIDs in the encryption scheme.

In Step 304, the encryption engine filters the data packets based on the data stream identifiers to obtain sets of data packets in accordance with one or more of the embodiments of the invention. Filtering identifies data packets containing media content and those containing other data, such as padding, program information, or other information. Based on the data stream identifiers and destination information, the data packets are encrypted using encryption schemes designated for the type of data packet and/or designated for the destination.

In Step 306, the filtered data packets are encrypted using an encryption scheme in accordance with one or more of the embodiments of the invention. Some of the data streams or data packets may be encrypted and others may not be encrypted, based upon the filtering. Encryption keys may be determined based on data stream identifiers and destination information, which reveals the clients' public keys. The encryption keys may be encrypted and send in-band (i.e. multiplexed) or out-of-band with the data stream to the clients.

In Step 308, the encryption engine attaches the encryption key(s) with the data stream to send to the client in accordance with one or more of the embodiments of the invention.

Finally, in Step 310, the encryption engine distributes the encrypted media content to the clients in accordance with one or more of the embodiments of the invention. In one or more embodiments of the invention, the data may be decrypted using the clients' private keys. Further, clients may display and/or use the decrypted data.

Figure 4:
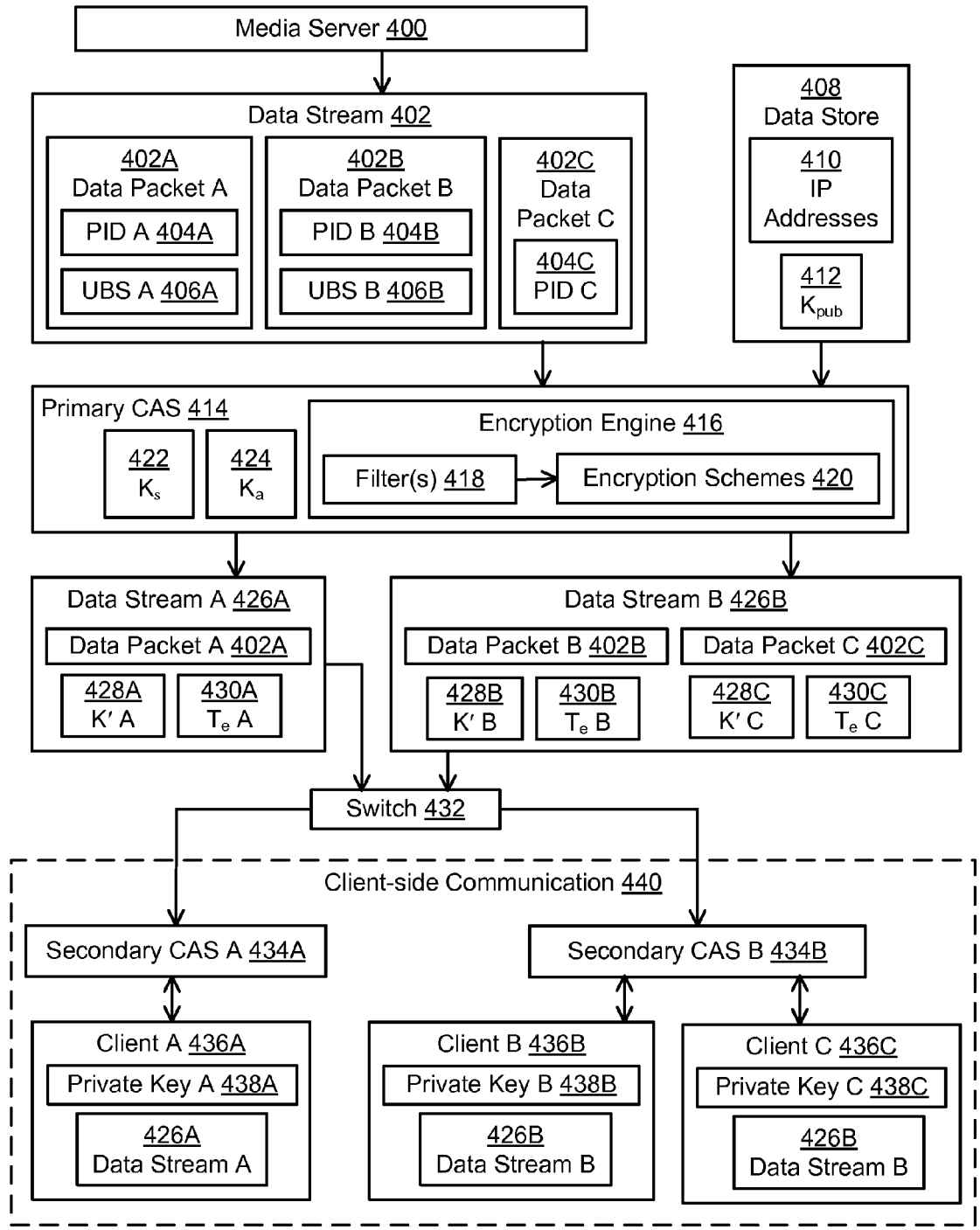
FIG. 4 shows an example transmission system in accordance with one or more embodiments of the invention.

FIG. 4 is an example in accordance with one or more embodiments of the invention. FIG. 4 shows an example of a method for transmitting a data stream. The example is not intended to limit the scope of the invention. The example is intended to show transmission of digital cable television signals following the MPEG-2 Transport Stream format. MPEG-2 is a standard for the generic coding of video and audio media content contained in digital signals broadcast by terrestrial, cable, and satellite systems. The Transport Stream (TS) format is a distinct container format defined by MPEG-2. TS is designed to carry digital video and audio signals over lossy media, such as broadcasting. TS is a communications protocol for data specified in the MPEG-2 standard, used to multiplex the data (i.e. combine several data streams into one signal over a shared medium) and synchronize the output. The MPEG-2 TS format may also be used for the transport of content over Internet protocol (IP) networks. As such, the content may be layered over UDP/IP or RTP/UDP/IP. A TS may be combined with other data with other data into one data stream, and the TS may contain several layers of information. For example, a TS may contain encryption data, program information (such as an electronic program guide), timing references, a Packetized Elementary Stream (PES), and an Elementary Stream (ES), among other data.

In one or more embodiments of the invention, the basic unit of a TS is a packet, consisting of a sync byte (with a value of 0x47), three one-bit flags, a 13-bit Packet Identifier (PID), a 4-bit continuity counter, the payload and additional optional fields. The sync byte (or, alternatively, syncword) is used to synchronize the packet. For example, the sync byte may synchronize the data by indicating the location of the start of the packet when the packet is received by a receiver. The three one-bit flags following the sync byte may be error indicators, indicate the location of the start of the payload, indicate the existence of additional fields within the packet, or indicate a status of high priority of the packet. The 13-bit PID uniquely identifies the packet within the data stream. The continuity counter indicates the location of the packet in the sequence of data within the data stream. The payload is the actual data carried by the TS that the client will display and use. The TS may contain unique bit sequences, which may also be used to identify the packet. An ES is the output of an encoder and contains only one type of data (e.g. audio or video) divided into blocks. An ES block contains a header (comprised of a sync byte and bits indicating protection type, presence of ancillary data, and other bits), error check bits, the payload, and any ancillary data. A PES divides an ES into data packets by encapsulating sequential data from the ES into PES packet headers. PES data packets may be encapsulated into TS data packets.

Continuing with FIG. 4, the media server (400) sends a data stream (402), which is made up of data packets (data packet A (402A), data packet B (402B) and data packet C (402C)). In the TS protocol in this example, a packet is 184 bytes in length. The TS packet is made up of a sync byte, three one-bit flags, a PID, a 4-bit continuity counter, and the payload. A unique bit sequence (UBS) may also be contained within the TS.

The example shows that, in one or more embodiments of the invention, data packet A (402A) has a PID A (404A) and unique bit sequence A (UBS A) (406A) within the packet. Similarly, data packet B has a PID B (404B) and a UBS B (406B). Data packet C (402C) has a PID C (404C). The data stream (402) is sent to the primary CAS (414) to be processed and encrypted. The primary CAS (414) contains stream keys ($K_s$) (422) and access keys ($K_a$) (424) used for encrypting the data in the TS. In one or more embodiments of the invention, when the data stream follows the MPEG-2 TS standard, the encryption engine (416) may encrypt data within the data stream (402) using a symmetric encryption technique, such as the AES algorithm. The AES algorithm encrypts the data in 128-bit blocks using an encryption key that is trivially related (i.e. there is a simple transform) to the decryption key. Alternatively, the encryption key may be identical to the decryption key. The AES algorithm expands the encryption key into a number of separate round keys, for example by using a key schedule, and uses the round keys to perform several rounds of transformation on the block of data being encrypted. Once the data has been encrypted with the AES algorithm, it may only be decrypted by someone with the decryption key.

In one or more embodiments of the invention, the encryption engine (416) may filter the data within the data stream (402) in preparation for encryption. In this example, the data stream (402) is filtered based on PID and UBS information. Filtering is performed using the filter(s) (418) and may include, but is not limited to, filtering based on any combination of PID, UBS, and destination. In one or more embodiments of the invention, the filter(s) (418) may look for unique identifying information; in this example they identify the data packets based on PID (i.e. 404A, 404B, 404C) and UBS (i.e. 406A, 406B). The filter(s) (418) may divide the data packets (i.e. data packet A (402A), data packet B (402B), and data packet C (402C) within the data stream (402) into multiple filtered data streams (i.e. data stream A (426A) and data stream B (426B)). In an alternative embodiment of the invention, the filter may combine data packets in a data stream or move data packets from one data stream to another. The data streams are encrypted using various encryption schemes. The encryption schemes may include keys of varying key lengths. For example, two data streams may both be encrypted with RSA encryption, however one data stream is encrypted using key lengths of 1024 bits and the other data stream is encrypted using key lengths of 2048 bits. In an alternative embodiment of two data streams, one data stream may be encrypted using RSA encryption, and the other data stream may be encrypted using AES encryption. In the example shown in FIG. 4, the data packets in data stream A (426A) and data stream B (426B) are each encrypted separately using AES encryption.

In one or more embodiments of the invention, to encrypt each data stream (i.e. data stream A (426A) and data stream B (426B)), the primary CAS (414) reads the TS header within each data stream to determine which encryption scheme to be applied to which data stream or data packets within the data stream. In this example, the payload of the TS data packets is to be encrypted. The filter(s) (418) determine which data packets within the data streams (data stream A (426A) and data stream B (426B)) are destined to client A (436A), client B (436B), and client C (436C). In addition, the primary CAS (414) determines the $K_s$ (422) which will be required to decrypt the encrypted data based on the destination information contained in the data streams (data stream A (426A) and data stream B (426B)).

For example, the primary CAS (414) examines the filtered data (e.g. data packet A (402A)), to determine its destination, and uses the destination information to select the $K_s$ (422) corresponding with the private key of the client at the destination. The $K_s$ (422) is used to decrypt data packet A (402A) later in this example. The encryption engine (416) uses AES encryption, as described above, to encrypt the filtered data (i.e. data packet A (402A)). The encryption engine (416) encrypts the $K_s$ (422) with $K_a$ (424) to obtain resultant protected stream keys, K' A (428A). The K' A (428A) are stored with the data (in-band) in the data stream. The access keys (i.e. $K_a$ (424)) are protected on an individual basis using the public key of the client ($K_{pub}$ (412)), obtained by the primary CAS (414) from the data store (408), to create an entitlement token, $T_e$ A (430A). The $T_e$ A (430A) are stored out-of-band. The primary CAS (414) places the encrypted data packet (i.e. data packet A (402A)) and the K' A (428A) into data stream A (426A). Alternatively, K' A (428A) may be sent out-of-band with data stream A (426A). The primary CAS (414) obtains the IP address for client A (436A) from the IP addresses (410) stored in the data store (408). The primary CAS (414) routes data stream A (426A) and $T_e$ A (430A) to its destination using the IP address; sending data stream A (426A) and $T_e$ A (430A) to the switch (432).

Also in FIG. 4, in one or more embodiments of the invention, the primary CAS (414) examines the filtered data, such as data packet B (402B) and data packet C (402C), to determine their destinations. For example, the primary CAS (414) uses the destination information to select the $K_s$ (422) corresponding with the private keys of the clients (i.e. ($K_{priv}$ B (438B) and $K_{priv}$ C (438C)). The private keys of the clients (i.e. ($K_{priv}$ B (438B) and $K_{priv}$ C (438C)) will be used to decrypt data packet B (402B) and data packet C (402C). The encryption engine (416) uses AES encryption to encrypt the filtered data (i.e. data packet B (402B) and data packet C (402C)) as described above. The encryption engine (416) encrypts the $K_s$ (422) with $K_a$ (424) for each client to obtain resultant protected stream keys, K' B (428B) and K' C (428C). The K' B (428B) and K' C (428C) may be stored with the data (i.e. in-band) or separate from the data (i.e. out-of-band). The access keys are protected on an individual basis using the public keys of the clients ($K_{pub}$ (412)), obtained from the data store (408), to create an entitlement tokens for the data stream corresponding to each client, $T_e$ B (430B) and $T_e$ C (430C). The $T_e$ B (430B) and $T_e$ C (430C) are stored out-of-band with the K' B (428B) and K' C (428C). The primary CAS (414) places the encrypted data packets (i.e. data packet B (402B) and data packet C (402C)) and the K's (i.e. K' B (428B) and K' C (428C)) into data stream B (426B). The $T_e$S (i.e. $T_e$ B (430B) and $T_e$ C (430C)) are placed in a separate stream to be sent to the clients. The primary CAS (414) obtains the IP address for client B (436B) and client C (436C) from the IP addresses (410) stored in the data store (408). The primary CAS (414) routes data stream B (426B) and the $T_e$s (separate from data stream B (426B)) to their destinations using these IP addresses; sending data stream B (426B) and the $T_e$S (i.e. $T_e$ B (430B) and $T_e$ C (430C) to the switch (432).

Continuing with the example shown in FIG. 4, the switch receives data stream A (426A), data stream B (426B) and $T_e$S (i.e. $T_e$ A (430A), $T_e$ B (430B) and $T_e$ C (430C)) from the primary CAS (414). The switch forwards each data stream and $T_e$s to their respective destinations. Data stream A (426A) and $T_e$ A (430A) is forwarded to client A (436A). Data stream B (426B) and $T_e$ B (430B) are forwarded to client B (436B). Data stream B (426B) and $T_e$ C (430C) are forwarded to client C (436C). In one or more embodiments of the invention, there is a secondary CAS dedicated to each client. A secondary CAS may be at a separate physical location than its associated client, or may be at the same location as the client.

In one or more embodiments of the invention, the secondary CAS uses the private key of its associated client to decrypt the data stream. In this example, secondary CAS A (434A) receives data stream A (426A) and secondary CAS B (434B) and secondary CAS C (434C) receive data stream B (426B). At secondary CAS A (434A), the $K_a$ (424) is recovered from the $T_e$ A (430A) using the private key ($K_{priv}$ A (438A)) provided by client A (436A). The $K_s$ (422) are recovered from K' A (428A) using $K_a$ (424). After recovering the $K_s$ (422), the secondary CAS A (434A) may decrypt the data. Client A (436A) may obtain the unencrypted data from data stream A (426A) and display the data; in this example the video content. In this example, client B (436B) and client C share a secondary CAS; secondary CAS B (434B). Secondary CAS B (434B) decrypts data in a similar method to secondary CAS A (434A). For example, each client provides the secondary CAS with their private key ($K_{priv}$ B (438B) and $K_{priv}$ C (438C)). Secondary CAS B (434B) uses $K_{priv}$ B (438B) to recover $K_a$ (424) from $T_e$ B (430B) and $K_{priv}$ C (438C) to recover $K_a$ (424) from $T_e$ C (430C). The $K_s$ (422) are recovered from K' B (428B) and K' C (428C), respectively, using the $K_a$ (424) for each. After recovering $K_s$ (422) for data packet B (402B), the secondary CAS B (434B) may decrypt data packet B (402B). Secondary CAS C (434C) may use the recovered $K_s$ (422) corresponding to data packet C (402C) to decrypt data packet C (402C). Client B (436B) and client C (436C) may obtain the unencrypted data from data stream B (426B) and data stream C (426C) respectively and each client may then display the data.

Figure 5:
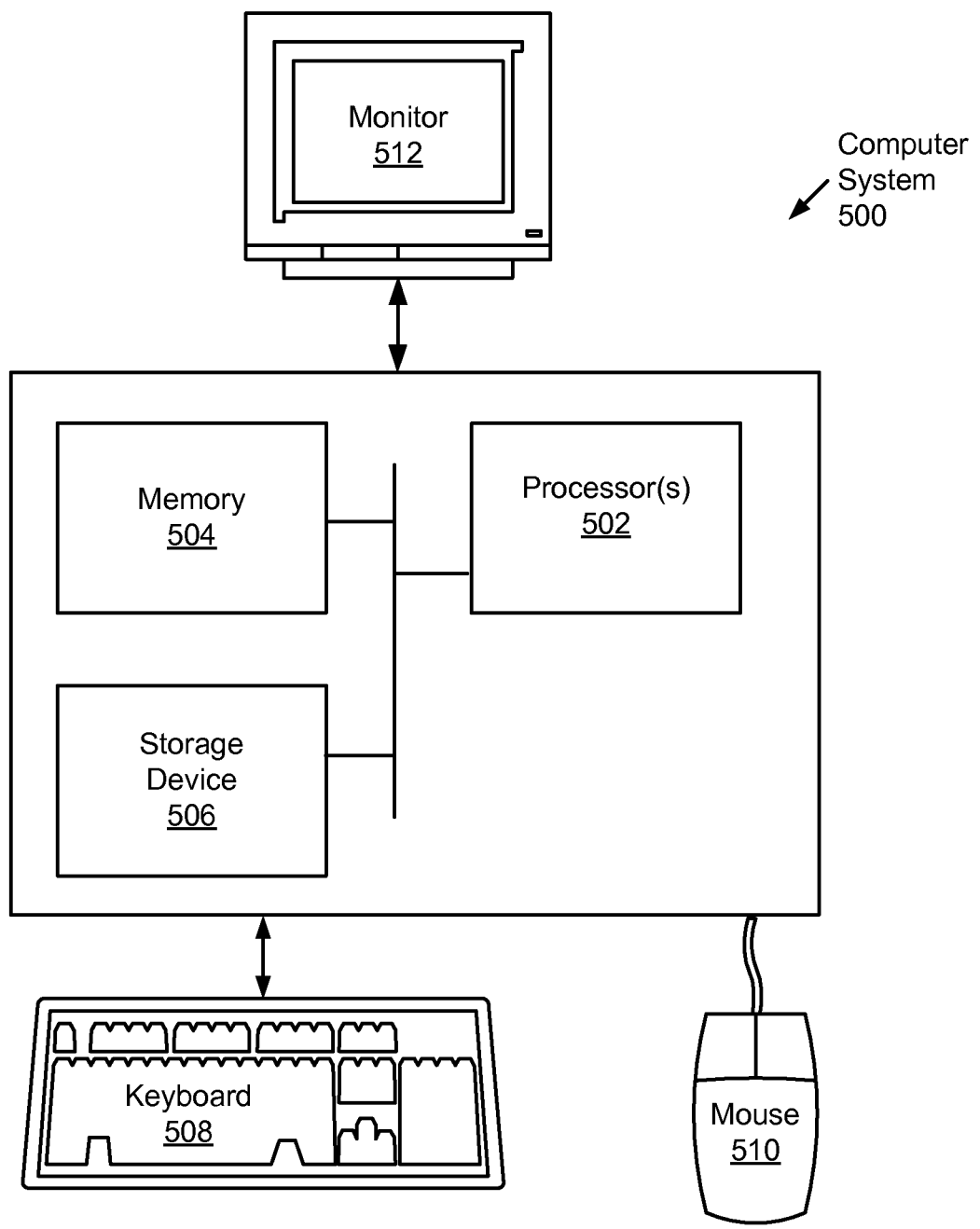
FIG. 5 show a computer system in accordance with one or more embodiments of the invention.

The invention (or portions thereof), may be implemented on virtually any type of computer system regardless of the platform being used. For example, as shown in FIG. 5, a computer system (500) may include a processor (502), associated memory (504), a storage device (506), and numerous other elements and functionalities. The computer (500) may also include an input means, such as a keyboard (508) and a mouse (510), and output means, such as a monitor (512). The computer system (500) may be connected to a local area network (LAN) or a wide area network (e.g. the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for distributing content to a plurality of clients in a network, comprising:
   receiving, from a media server, an original data stream comprising a plurality of data packets;

identifying a first intended recipient of a first subset of the plurality of data packets of the original data stream, wherein the first intended recipient is a first client of the plurality of clients, wherein the first subset of the plurality of data packets is selected based on a plurality of program identifications (PIDs), a plurality of unique bit sequences (UBSs), and a plurality of IP addresses;

encrypting, by a computer processor and using a first stream key, the first subset of the plurality of data packets to generate a first plurality of encrypted packets;

encrypting, by the computer processor and using a first access key, the first stream key to generate a first encrypted stream key;

obtaining a first public key associated with the first client;

encrypting, by the computer processor and using the first public key, the first access key to generate a first enablement token;

sending the first enablement token to the first client, wherein the first client decrypts the first enablement token using a first private key to obtain the first access key;

identifying a second intended recipient of the first subset of the plurality of data packets of the original data stream, wherein the second intended recipient is a second client of the plurality of clients;

obtaining a second public key associated with the second client;

encrypting, by the computer processor and using the second public key, the first access key to generate a second enablement token;

sending the second enablement token to the second client, wherein the second client decrypts the second enablement token using a second private key to obtain the first access key;

identifying a third intended recipient of a second subset of the plurality of data packets of the original data stream, wherein the third intended recipient is a third client of the plurality of clients;

encrypting, by the computer processor and using a second stream key, the second subset of the plurality of data packets to generate a second plurality of encrypted packets;

encrypting, by the computer processor and using a second access key, the second stream key to generate a second encrypted stream key;

obtaining a third public key associated with the third client;

encrypting, by the computer processor and using the third public key, the second access key to generate a third enablement token;

sending the third enablement token to the third client, wherein the third client decrypts the third enablement token using a third private key to obtain the second access key;

generating, based on the original data stream, a first encrypted data stream comprising the first plurality of encrypted packets and the first encrypted stream key;

generating, based on the original data stream, a second encrypted data stream comprising the second plurality of encrypted packets and the second encrypted stream key;

sending the first encrypted data stream to the first client and the second client, wherein the first client decrypts the first encrypted stream key using the first access key to obtain the first stream key, wherein the second client decrypts the first encrypted stream key using the first access key to obtain the first stream key, wherein the first client uses the first stream key to decrypt the plurality of encrypted packets, and wherein the second client uses the first stream key to decrypt the first plurality of encrypted packets; and sending the second encrypted data stream to the third client, wherein the third client decrypts the second encrypted stream key using the second access key to obtain the second stream key, and wherein the third client uses the second stream key to decrypt the second plurality of encrypted packets.

2. The method of claim 1, wherein the first subset of the plurality of data packets is encrypted using a first encryption scheme, wherein the second subset of the plurality of data packets is encrypted using a second encryption scheme, and wherein the first encryption scheme is an Advanced Encryption Standard (AES) scheme.

3. The method of claim 1, wherein the original data stream conforms to the MPEG-2 Transport Stream (TS) format.

4. A system for encrypting a data stream, comprising:

a media server configured to transmit an original data stream comprising a plurality of data packets;

a primary conditional access system (CAS) operatively connected to the media server and configured to:

identify a first intended recipient of a first subset of the plurality of data packets of the original data stream, wherein the first intended recipient is a first client of the plurality of clients, wherein the first subset of the plurality of data packets is selected based on a plurality of program identifications (PIDs), a plurality of unique bit sequences (UBSs), and a plurality of IP addresses;

encrypt, using a first stream key, the first subset of the plurality of data packets to generate a first plurality of encrypted packets;

encrypt, using a first access key, the first stream key to generate a first encrypted stream key;

obtain a first public key associated with the first client;

encrypt, using the first public key, the first access key to generate a first enablement token;

send the first enablement token to the first client, wherein the first client decrypts the first enablement token using a first private key to obtain the first access key;

identify a second intended recipient of first subset of the plurality of data packets of the original data stream, wherein the second intended recipient is a second client of the plurality of clients;

obtain a second public key associated with the second client;

encrypt, using the second public key, the first access key to generate a second enablement token;

send the second enablement token to the second client, wherein the second client decrypts the second enablement token using a second private key to obtain the first access key;

identify a third intended recipient of a second subset of the plurality of data packets of the original data stream, wherein the third intended recipient is a third client of the plurality of clients;

encrypt, using a second stream key, the second subset of the plurality of data packets to generate a second plurality of encrypted packets;

encrypt, using a second access key, the second stream key to generate a second encrypted stream key;

obtain a third public key associated with the third client;

encrypt, by the computer processor and using the third public key, the second access key to generate a third enablement token;

send the third enablement token to the third client, wherein the third client decrypts the third enablement token using a third private key to obtain the second access key;

generate, based on the original data stream, a first encrypted data stream comprising the first plurality of encrypted packets and the first encrypted stream key;

generate, based on the original data stream, a second encrypted data stream comprising the second plurality of encrypted packets and the second encrypted stream key;

send the first data stream to the first client and the second client,
wherein the first client decrypts the first encrypted stream key using the first access key to obtain the first stream key,
wherein the second client decrypts the first encrypted stream key using the first access key to obtain the first stream key,
wherein the first client uses the first stream key to decrypt the plurality of encrypted packets, and
wherein the second client uses the first stream key to decrypt the first plurality of encrypted packets; and send the second data stream to the third client,
wherein the third client decrypts the second encrypted stream key using the second access key to obtain the second stream key, and
wherein the third client uses the second stream key to decrypt the second plurality of encrypted packets.

5. The method of claim 4,
wherein the first subset of the plurality of data packets is encrypted using a first encryption scheme,
wherein the second subset of the plurality of data packets is encrypted using a second encryption scheme, and
wherein the first encryption scheme is an Advanced Encryption Standard (AES) scheme.

6. The system of claim 4, wherein the original data stream conforms to the MPEG-2 Transport Stream (TS) format.

7. The system of claim 4, wherein the primary CAS selects the first subset of the plurality of data packets based on a data stream identifier of the original data stream.

* * * * *